(12) United States Patent
Turk et al.

(10) Patent No.: US 9,661,807 B2
(45) Date of Patent: May 30, 2017

(54) CONDUIT WITH CONNECTOR AND ASSEMBLY THEREOF

(71) Applicant: Rain Bird Corporation, Azusa, CA (US)

(72) Inventors: Michael F. Turk, Porter Ranch, CA (US); Samir Shah, Chino Hills, CA (US); Gerhard Stoltz, Temecula, CA (US)

(73) Assignee: Rain Bird Corporation, Azusa, CA (US)

( * ) Notice: Subject to any disclaimer, the term of this patent is extended or adjusted under 35 U.S.C. 154(b) by 281 days.

(21) Appl. No.: 13/837,738

(22) Filed: Mar. 15, 2013

(65) Prior Publication Data

US 2014/0021273 A1    Jan. 23, 2014

Related U.S. Application Data

(60) Provisional application No. 61/651,433, filed on May 24, 2012, provisional application No. 61/754,396, filed on Jan. 18, 2013.

(51) Int. Cl.
*B05B 15/00* (2006.01)
*A01G 25/02* (2006.01)

(52) U.S. Cl.
CPC .......... *A01G 25/023* (2013.01); *A01G 25/02* (2013.01); *Y10T 29/49826* (2015.01); *Y10T 137/9029* (2015.04)

(58) Field of Classification Search
CPC ....... A01G 25/02; A01G 25/023; B29D 23/00
USPC .................... 239/547, 450, 544, 587.1, 587.2
See application file for complete search history.

(56) References Cited

U.S. PATENT DOCUMENTS

| | | | |
|---|---|---|---|
| 1,484,575 | A | 2/1924 | Shulin |
| 1,960,472 | A | 5/1934 | Balaam et al. |
| 2,148,419 | A | 2/1939 | Parker |
| 2,281,172 | A | 4/1942 | Rodgers |
| 2,287,354 | A | 6/1942 | Misch |
| 2,344,163 | A | 3/1944 | Misch |

(Continued)

FOREIGN PATENT DOCUMENTS

| | | |
|---|---|---|
| EP | 0594361 | 4/1994 |
| FR | 2 704 117 A1 | 10/1994 |

(Continued)

OTHER PUBLICATIONS

PCT International Search Report and Written Opinion of the International Searching Authority dated Aug. 29, 2013 for International Application No. PCT/US2013/042683, 9 pages.

(Continued)

*Primary Examiner* — Davis Hwu
(74) *Attorney, Agent, or Firm* — Fitch, Even, Tabin & Flannery, LLP

(57) ABSTRACT

A fluid supply line is provided to reduce the labor and cost required for dripline system installations by providing predetermined fitting locations where driplines can be attached. The supply line consists of a conduit having a side wall, a connector extending through the side wall of the conduit, the connector having a conduit connecting segment extending outside the conduit and an inlet segment extending into the conduit, and the inlet segment being connected to the side wall of the conduit.

50 Claims, 17 Drawing Sheets

(56) References Cited

U.S. PATENT DOCUMENTS

| | | |
|---|---|---|
| 2,598,961 A | 6/1952 | Andrus |
| 2,605,140 A | 7/1952 | Bartling |
| 2,839,075 A | 6/1958 | Mueller |
| 3,030,031 A | 4/1962 | Barker |
| 3,199,791 A | 8/1965 | Chapin |
| 3,256,693 A | 6/1966 | Mathis |
| 3,335,964 A | 8/1967 | Singleton |
| 3,349,792 A | 10/1967 | Larkin |
| 3,361,363 A | 1/1968 | Babington |
| 3,429,125 A | 2/1969 | Shotion |
| 3,432,188 A | 3/1969 | Turner |
| 3,471,176 A | 10/1969 | Gilchrist |
| 3,489,441 A | 1/1970 | Malcolm |
| 3,503,407 A | 3/1970 | Nooy |
| 3,516,426 A | 6/1970 | Toll |
| 3,672,571 A | 6/1972 | Goodricke |
| 3,756,267 A | 9/1973 | Hutton |
| 3,762,263 A | 10/1973 | Bocceda |
| 3,806,031 A | 4/1974 | Olson |
| 3,849,639 A | 11/1974 | Brock |
| 3,863,960 A | 2/1975 | Andersson |
| 3,870,431 A | 3/1975 | Luckenbill |
| 3,872,880 A | 3/1975 | Ver Nooy |
| 3,876,146 A | 4/1975 | Pacheco |
| 3,891,247 A | 6/1975 | Smith |
| 3,920,037 A | 11/1975 | Hoff |
| 3,973,732 A | 8/1976 | Diggs |
| 3,976,091 A | 8/1976 | Hutton |
| 3,999,785 A | 12/1976 | Blakeley |
| 4,018,459 A | 4/1977 | Mominee et al. |
| 4,018,464 A | 4/1977 | Acda |
| 4,056,229 A * | 11/1977 | Jones .................... B60S 3/044 239/288 |
| 4,063,844 A | 12/1977 | Pessia |
| 4,065,926 A | 1/1978 | Brandt |
| 4,076,038 A | 2/1978 | Wynne |
| 4,100,940 A | 7/1978 | Spears |
| 4,134,550 A | 1/1979 | Bright, Sr. |
| 4,239,265 A | 12/1980 | King, Sr. |
| 4,278,279 A | 7/1981 | Zimmerman |
| 4,317,539 A | 3/1982 | Pollock |
| 4,391,458 A | 7/1983 | Blakeley |
| 4,522,339 A | 6/1985 | Costa |
| 4,562,963 A * | 1/1986 | Butler ........................ 239/273 |
| 4,606,558 A | 8/1986 | Davidson |
| 4,611,624 A | 9/1986 | Snyder |
| 4,626,142 A | 12/1986 | Brin |
| 4,655,480 A | 4/1987 | Thalmann |
| 4,674,681 A | 6/1987 | Meis |
| 4,708,373 A | 11/1987 | Morriss, Jr. |
| 4,719,936 A | 1/1988 | Tsubakimoto |
| 4,730,636 A | 3/1988 | Volgstadt |
| 4,753,394 A | 6/1988 | Goodman |
| 4,789,189 A | 12/1988 | Robertson |
| 4,809,735 A | 3/1989 | Volgstadt |
| 4,930,934 A | 6/1990 | Adkins |
| 4,956,916 A | 9/1990 | Robertson |
| 4,966,397 A | 10/1990 | McKinnon |
| 5,020,832 A | 6/1991 | Coblentz |
| 5,040,828 A | 8/1991 | Kane |
| 5,066,053 A | 11/1991 | Miller |
| 5,076,318 A | 12/1991 | Fedora |
| 5,095,564 A | 3/1992 | Kruger |
| 5,105,844 A | 4/1992 | King, Sr. |
| 5,111,995 A | 5/1992 | Dumitrascu et al. |
| 5,169,177 A | 12/1992 | McLennan |
| 5,241,981 A | 9/1993 | Ahern |
| 5,285,968 A * | 2/1994 | McSheehy .................... 239/273 |
| 5,286,070 A | 2/1994 | Williams |
| 5,360,241 A | 11/1994 | Gundy |
| 5,425,395 A | 6/1995 | Brennan |
| 5,507,536 A | 4/1996 | Oliveto, II et al. |
| 5,553,898 A | 9/1996 | Rogers, Jr. |
| 5,659,935 A | 8/1997 | Lo-Pinto |
| 5,692,858 A | 12/1997 | Vaughan |
| 5,694,971 A | 12/1997 | Wilcock |
| 5,694,972 A | 12/1997 | King |
| 5,732,732 A | 3/1998 | Gross |
| 5,829,474 A | 11/1998 | Bolender |
| 5,839,659 A | 11/1998 | Murray |
| 5,893,686 A | 4/1999 | Weiler |
| 5,927,615 A | 7/1999 | Turk |
| 5,938,372 A | 8/1999 | Lichfield |
| 5,964,240 A | 10/1999 | Granovski |
| 6,012,475 A | 1/2000 | Taylor |
| 6,216,723 B1 | 4/2001 | King |
| 6,293,477 B1 | 9/2001 | Chambers |
| 6,357,472 B1 | 3/2002 | King |
| 6,394,368 B1 | 5/2002 | Hintz |
| 6,412,824 B2 | 7/2002 | Kunsman |
| 6,454,312 B1 | 9/2002 | Desorcy |
| 6,510,865 B2 | 1/2003 | King, Jr. |
| 6,601,605 B2 | 8/2003 | King, Jr. |
| 6,612,330 B1 | 9/2003 | Robison |
| 6,640,827 B1 | 11/2003 | McClure |
| 6,648,377 B2 | 11/2003 | Marandi |
| 6,648,562 B1 | 11/2003 | Calkins |
| 6,681,796 B2 | 1/2004 | King, Jr. |
| 6,758,237 B2 | 7/2004 | Sichler |
| 6,767,033 B2 | 7/2004 | King, Jr. |
| 6,773,036 B1 | 8/2004 | King |
| 6,854,616 B2 | 2/2005 | Steffan |
| 6,907,896 B1 | 6/2005 | Christodoulou |
| 6,959,882 B1 | 11/2005 | Potts |
| 6,986,532 B1 | 1/2006 | King |
| 6,996,932 B2 | 2/2006 | Kruer |
| 6,997,402 B2 | 2/2006 | Kruer |
| 7,021,328 B2 | 4/2006 | Robison |
| 7,048,010 B2 | 5/2006 | Golan et al. |
| 7,150,289 B2 | 12/2006 | Mortensen |
| 7,219,684 B2 | 5/2007 | Dabir |
| 7,392,614 B2 | 7/2008 | Kruer |
| 7,523,965 B2 | 4/2009 | Masarwa |
| 7,588,201 B2 | 9/2009 | Masarwa et al. |
| 7,647,724 B2 | 1/2010 | Caron |
| 7,670,521 B2 | 3/2010 | Campau |
| 7,673,418 B2 | 3/2010 | Wong |
| 7,862,254 B2 | 1/2011 | Jin Hyun et al. |
| 7,913,935 B2 | 3/2011 | Einav et al. |
| 7,954,732 B2 | 6/2011 | Shekalim |
| 8,091,800 B2 | 1/2012 | Retter et al. |
| 8,132,739 B2 | 3/2012 | Theort |
| 8,220,838 B2 | 7/2012 | Masarwa et al. |
| 8,672,240 B2 | 3/2014 | Masarwa et al. |
| 8,770,888 B2 | 7/2014 | Helbig |
| 8,898,876 B2 | 12/2014 | Feith |
| 9,167,757 B2 | 10/2015 | Hamann |
| 9,173,353 B2 | 11/2015 | Hamann |
| 9,173,354 B2 | 11/2015 | Hamann |
| 9,179,610 B2 | 11/2015 | Hamann |
| 9,241,449 B2 | 1/2016 | Hamann |
| 9,414,551 B2 | 8/2016 | Masarwa |
| 2002/0098322 A1 | 7/2002 | Cripp |
| 2004/0046045 A1* | 3/2004 | Alexander et al. .......... 239/201 |
| 2004/0113425 A1 | 6/2004 | King |
| 2004/0222321 A1 | 11/2004 | Golan et al. |
| 2005/0023382 A1 | 2/2005 | Fiedler et al. |
| 2005/0034762 A1 | 2/2005 | Maier |
| 2005/0080481 A1* | 4/2005 | Madda et al. ............... 623/1.22 |
| 2005/0194469 A1 | 9/2005 | Masarwa et al. |
| 2006/0027266 A1 | 2/2006 | Kim |
| 2006/0065306 A1 | 3/2006 | Mortensen |
| 2006/0185241 A1 | 8/2006 | Theoret |
| 2006/0272726 A1 | 12/2006 | Golan et al. |
| 2007/0144065 A1 | 6/2007 | Lowe |
| 2007/0189852 A1 | 8/2007 | Wolfley |
| 2007/0228725 A1 | 10/2007 | Campau |
| 2008/0155892 A1 | 7/2008 | Katzir-Shimoni et al. |
| 2008/0169641 A1 | 7/2008 | Santa Cruz et al. |
| 2008/0282609 A1 | 11/2008 | Nelson |
| 2009/0224078 A1 | 9/2009 | Anderson |
| 2009/0243146 A1 | 10/2009 | Retter et al. |
| 2012/0080879 A1 | 4/2012 | Gauthier |
| 2012/0097196 A1 | 4/2012 | Cohen |

(56) References Cited

U.S. PATENT DOCUMENTS

| | | |
|---|---|---|
| 2012/0111972 A1 | 5/2012 | Theoret |
| 2012/0248759 A1 | 10/2012 | Feith |
| 2013/0007440 A1 | 1/2013 | Shah |
| 2013/0074400 A1 | 3/2013 | Roess |
| 2013/0183097 A1 | 7/2013 | Scantling |
| 2014/0001743 A1 | 1/2014 | Keren |
| 2014/0252103 A1 | 9/2014 | Hamann |
| 2014/0252112 A1 | 9/2014 | Hamann |
| 2014/0252113 A1 | 9/2014 | Hamann |
| 2014/0252114 A1 | 9/2014 | Hamann |
| 2014/0252133 A1 | 9/2014 | Hamann |
| 2015/0144717 A1 | 5/2015 | Turk |
| 2016/0113218 A1 | 4/2016 | Turk |

FOREIGN PATENT DOCUMENTS

| | | |
|---|---|---|
| GB | 2 037 921 A | 7/1980 |
| RU | 90653 | 1/2010 |
| RU | 2 417 579 C2 | 5/2011 |
| WO | 2007029234 | 3/2007 |
| WO | 2013107954 | 7/2013 |
| WO | 2013177530 | 11/2013 |
| WO | 2016065287 | 4/2016 |

OTHER PUBLICATIONS

U.S. Appl. No. 14/087,900 entitled "Conduit With Connector and Assembly Thereof," filed Nov. 22, 2013, 72 pages.
Toro, Loc-Eze Fittings and Accessories, http://www.toro.com/en-gb/homeowner/professional-irrigation/landscape-drip/Pages/Model.aspx?pid=loc-eze-fittings-and-accessories, publicly available before May 24, 2012, one page.
Netafim Brochure, "Polynet Flexible Pipes," publicly available before May 24, 2012, 8 pages.
Netafim Brochure, "Flatnet Flexible Pipes," publicly available before May 24, 2012, 8 pages.
Netafim Brochure, "Flexible Pipes Flatnet," publicly available before May 24, 2012, pp. 16-20.
U.S. Appl. No. 62/067,938, filed Oct. 23, 2014, entitled "Drip Emitter Tubing Expandable Into Grid," 35 pages.
Rain Bird Corporation, Comparison of QF Dripline Header to prior art PVC Header, publicly available Jan. 2015, 1 page.
Hunter Industries, "Drip Irrigation Design & Installation Guide," bearing a copyright date of 2012, 32 pages.
Hunter Industries Brochure, "ECO-MAT and PLD-ESD: Subsurface Irrigation," bearing a copyright date of 2012, 8 pages.
Kisss, "Nano-Technical Specification: Subsurface Textile Irrigation (SSTI)," bearing an updated date of Jan. 2015, 2 pages.
Kisss, "Subsurface Textile Irrigation (SSTI)—Fact Sheet," bearing an updated date of Jan. 2015, 6 pages.
PCT International Search Report and Written Opinion of the European Patent Office International Searching Authority for International Application PCT/US2015/057160, mailed Mar. 10, 2016, 11 pages.
U.S. Appl. No. 14/087,900; Office Action mailed Apr. 5, 2016; 8 pages.
U.S. Appl. No. 14/087,900; Office Action mailed Oct. 5, 2016; (7 pages).
Antelco Irrigation Equipment, Xpando Take-Off Fittings, USA Catalog, 2012, p. 5.1.
Antelco Irrigation Equipment, Take-Off Fittings, Metric Catalogue, 2014, pp. 5.4 and 5.5.
Pictures showing technique for connecting a feed tube for a sprinkler to poly tubing which includes forming a hole in the poly tubing, the technique and components used all being publicly available more than one year before May 24, 2012, 3 pages.
U.S. Appl. No. 14/921,484; Office Action mailed 01-26-207.
U.S. Appl. No. 14/087,900; Notice of Allowance mailed Jan. 26, 2017.

* cited by examiner

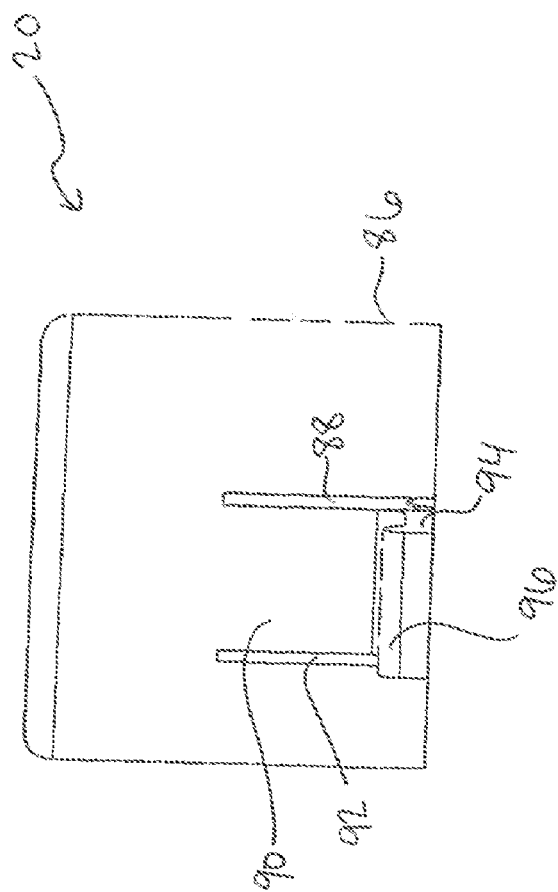

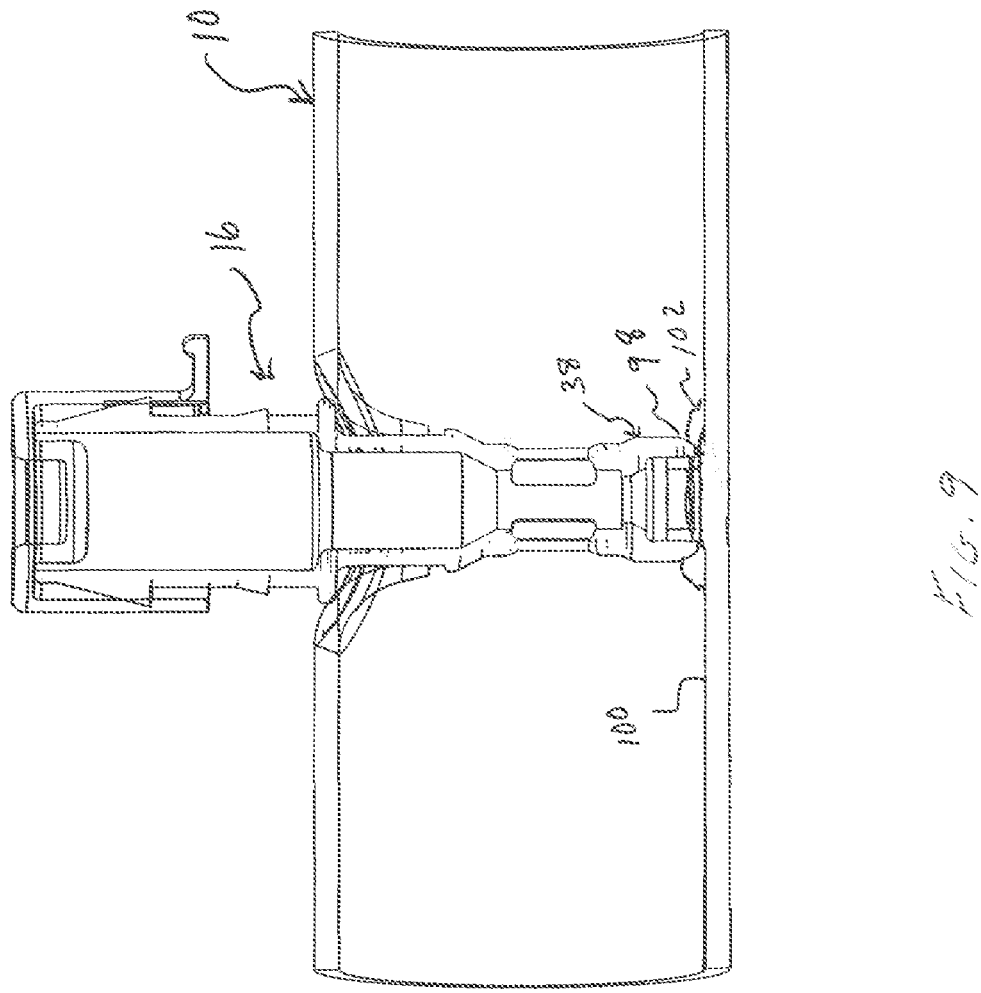

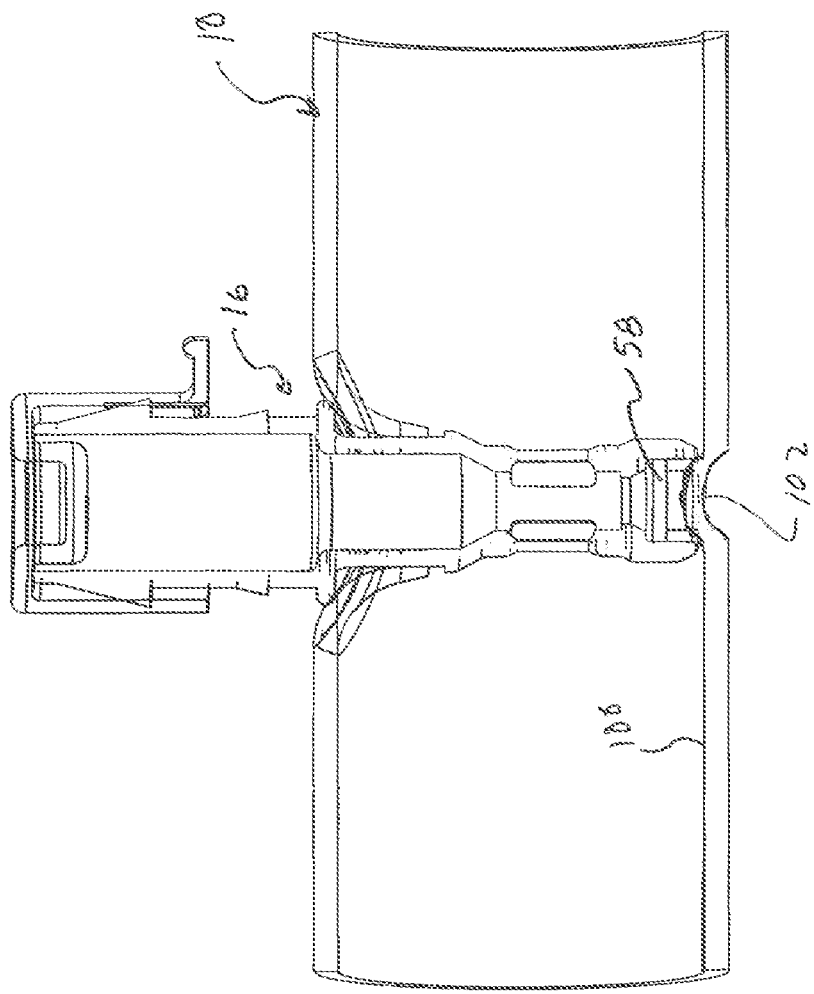

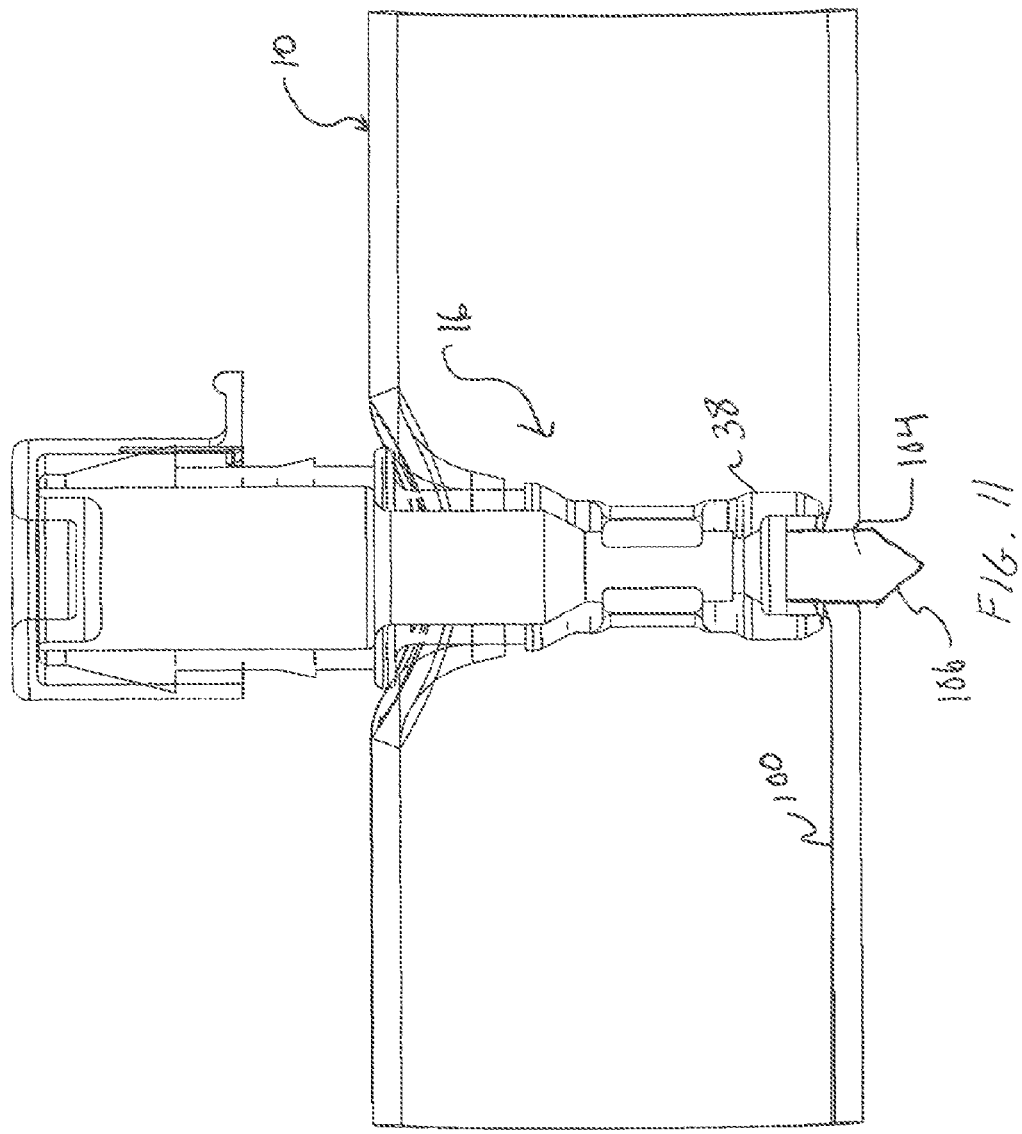

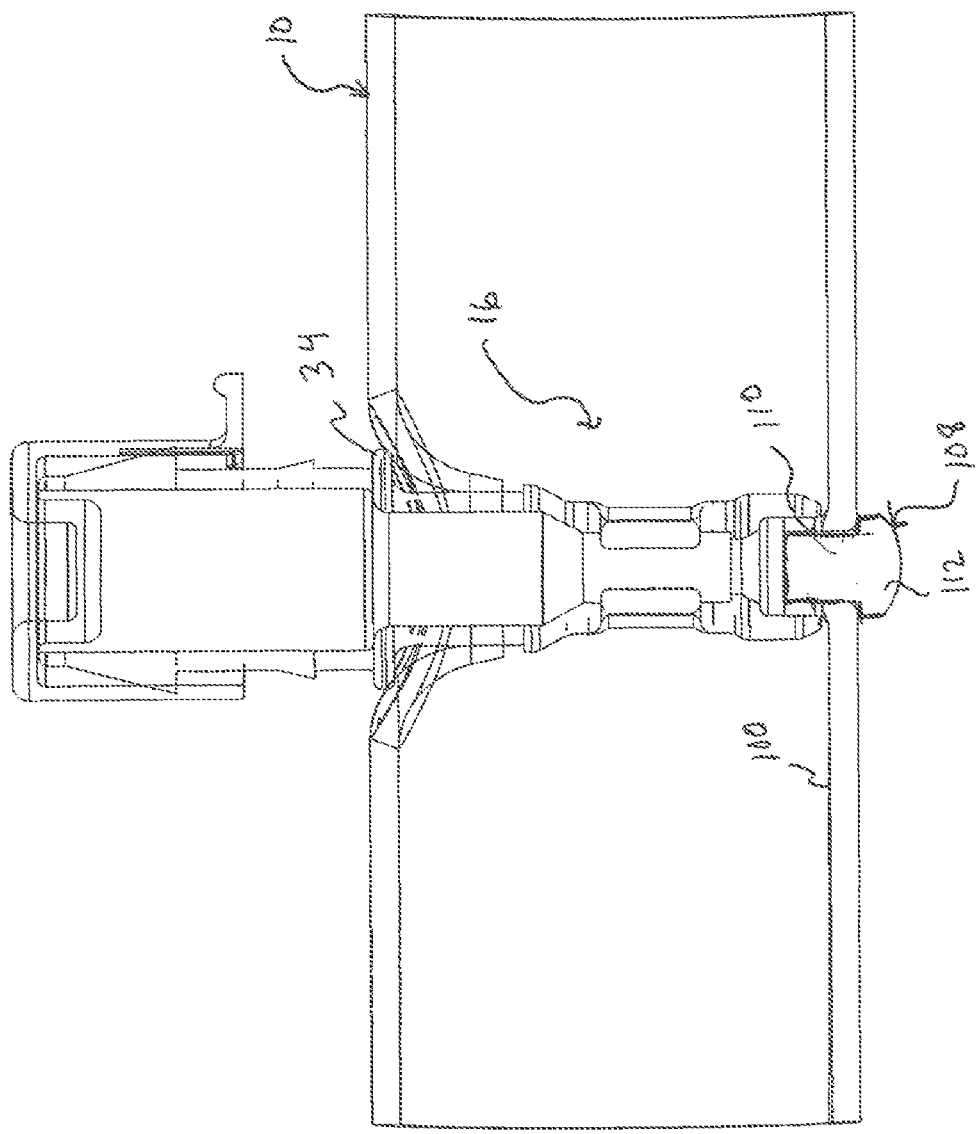

CONDUIT WITH CONNECTOR AND ASSEMBLY THEREOF

CROSS-REFERENCE TO RELATED APPLICATIONS

This application claims the benefit of U.S. Provisional Application No. 61/754,396, filed Jan. 18, 2013 and U.S. Provisional Application No. 61/651,433, filed May 24, 2012, both applications are incorporated herein by reference in their entirety.

FIELD

This invention relates to fluid delivery and, more particularly, to conduits with fluid conduit connectors.

BACKGROUND

Traditional installations of dripline systems, especially larger grid type layouts, require a significant amount of the components to be assembled on site during installation. A typical dripline system requires a supply line to feed lateral extending driplines. A flusher line also is needed to flush the system. One approach is to use polyvinylchloride (PVC) pipe and fittings, such as T-fittings, to provide lateral connections for the driplines. A main drawback to this approach is that it requires a significant amount of labor, which increases the cost of such systems.

More specifically, the piping must be measured and cut, and the T-fitting must be attached. The cut end of the piping must be cleaned to remove any hanging chads of plastic hanging on to the cut end. The cut end outer surface of the piping and the inner surface of the T-fitting should be roughened for a better connection. Then, primer is applied to the roughened surface. After a short period of time, PVC glue is applied over the primer and the connection is made by turning one of the components into or onto the other.

In addition to increased costs, this approach creates potential for the grid to be unevenly created and can lead to plastic chads, dirt and other foreign debris getting into the system because the fabrication of the system typically occurs in the trenches where the lines will be buried. As a result, the system also must be flushed to clean any of the foreign debris.

There have been attempts to reduce the amount of labor required for installation with the use of special fittings, such as insert fittings or saddle tees, that tap into the piping. However, these methods still require a significant amount of labor in the field to install the special fittings and can lead to inaccurate spacing between the drip lines and debris in the lines.

Thus, there is a desire for an improved supply line that reduces the costs of installation, provides a guide for installing a more accurate dripline grid system, and eliminates unwanted foreign debris from inside the lines.

BRIEF DESCRIPTION OF THE DRAWINGS

FIG. 6 is a cross-sectional view of the connector of FIG. 2 taken along line 2-2 of FIG. 2;

FIG. 8 is an elevational view of the cap of the connector of FIG. 2;

FIG. 10 is a cross-section view of a second alternate embodiment of a lateral connector attached to the main supply line;

FIG. 11 is a cross-section view of a third alternate embodiment of a lateral connector attached to the main supply line;

FIG. 12 is a cross-section view of a fourth alternate embodiment of a lateral connector attached to the main supply line;

DETAILED DESCRIPTION OF THE PREFERRED EMBODIMENTS

Figure 1:
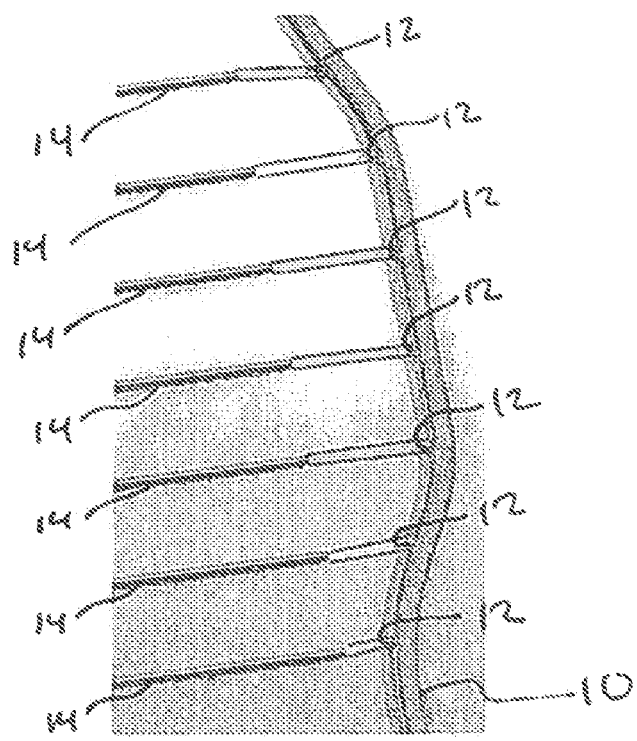
FIG. 1 is a perspective view of a main supply line with lateral driplines.

As illustrated in FIG. 1, there is shown a preassembled main supply line 10. The preassembled main supply line 10 reduces labor and improves installation by providing predetermined fitting locations where driplines can be attached. In addition to labor benefits, the predetermined spacing will improve accuracy of the irrigation system since measurements will not have to be carried out during installation. This will aid in providing an accurate installation of a dripline grid. It also will reduce the potential for plastic and other foreign dirt and debris to enter the main supply line during installation.

The main supply line 10 includes a series of pre-installed lateral connectors 12. Each connector allows a lateral line, such as a dripline 14, to be connected to the supply line 10. The connectors are typically spaced at equidistant intervals, such as 12 inches, along the supply line 10 to provide proper spacing for the driplines in the field. They, however, may be spaced at varying intervals, depending on the application. The main supply line 10 and driplines 14 may be buried for subsurface application of water or remain on the surface for topical application of water.

Figure 2:
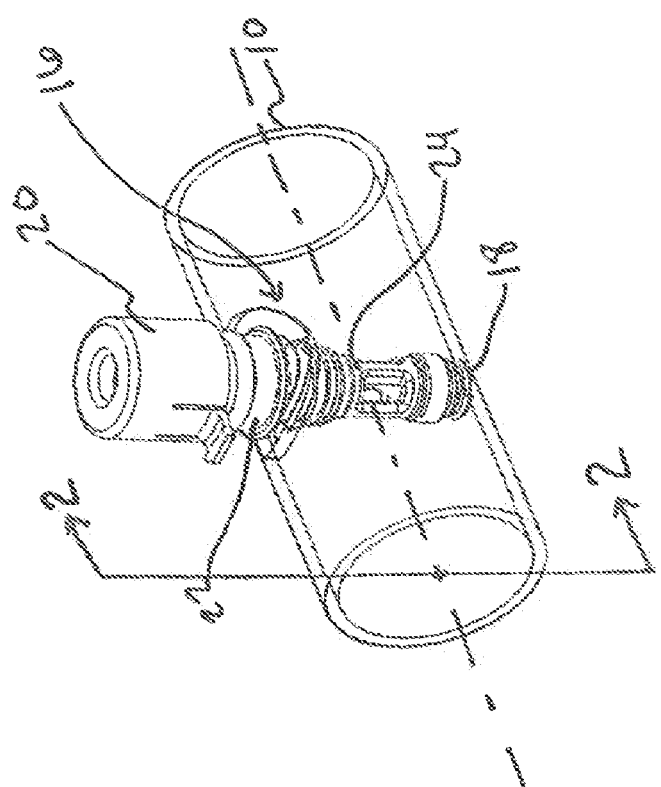
FIG. 2 is a perspective view of a lateral connector with a cap attached thereto and the main supply line being transparent.
Figure 3:
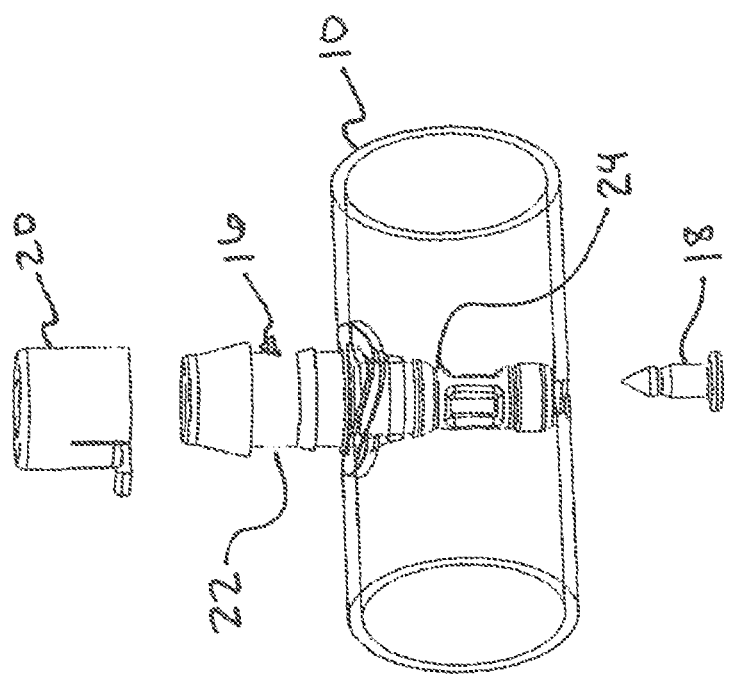
FIG. 3 is a partially exploded perspective view of the lateral connector of FIG. 2 with the main supply line being transparent.

Referring to FIGS. 2 and 3, the lateral connector 12 is shown together with the main supply line 10. The main supply line 10 may be made of plastic, such as polyethylene, and may have any dimensions for its inside and outside diameters, including for example, an inside diameter in the range of 0.520 to 1.060 inches and an outside diameter in the range of 0.620 to 1.184 inches. The connector 12 will have to be sized according to the dimensions of the inside and outside diameter of the main supply line 10.

The connector 12 includes a connector body 16, a stabilization plug 18, and a protective cap 20. The components can be made from a sturdy, break-resistant plastic, such as high-density polyethylene. The connector body 16 has a connector segment 22 extending laterally from the outside of the supply line 10 and an inlet segment 24 extending laterally to the inside of the supply line 10. The connector segment 22 is configured to be inserted into and grip a lateral line, such as a dripline 14, to form a watertight connection. The connector segment 22 also is configured to be inserted into the protective cap 20. The supply line 10 is typically shipped in a spool like configuration so the cap 20 protects the supply line 10 from puncturing itself. The cap 20 also prevents debris from entering the connector 12 during field installation, which aids against clogging. The cap 20 is removed to attach driplines. The inlet segment 24 taps fluid from the supply line 10 for the dripline 14. The stabilization plug 18 is inserted through the supply line 10 on the side opposite of the connector body 16 and interconnects with the inlet segment 24 of the connector body 16. The plug 18 provides additional stability to the connector 12 by creating an additional constraint against wobbling.

Figure 4:
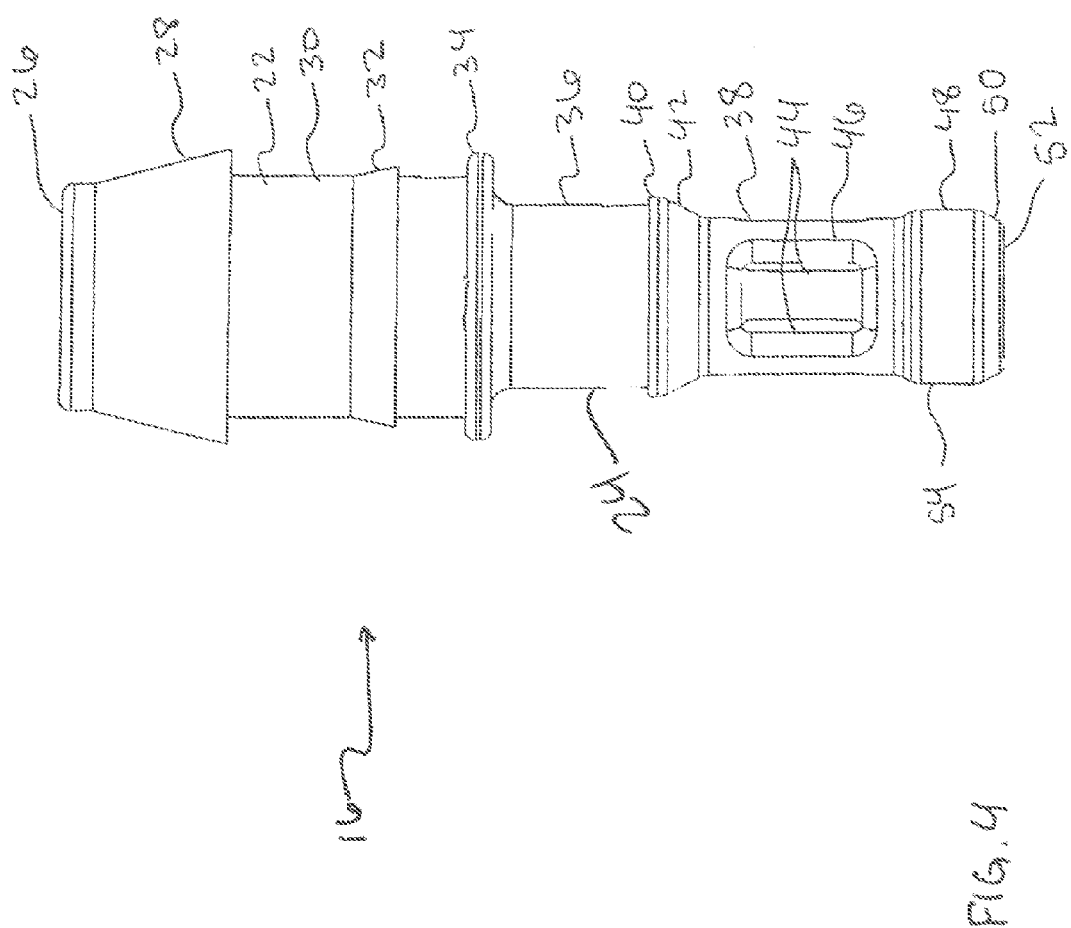
FIG. 4 is a side elevational side view of the connector of FIG. 2.

Referring to FIG. 4, the connector segment 22 of the body 16 has a generally cylindrical shape defining an opening 26 at one end and a passage thereafter. The opening 26 provides an outlet for the fluid from the main supply line 10. On the exterior, the connector segment 22 includes an outer barb 28, an outer cylindrical body 30, an inner barb 32 and an outer stop collar 34. For example, the diameter of the opening 26 could be 0.512 inches, the diameter for the cylindrical body 30 could be 0.545 inches, and the diameter for the outer stop collar 34 could be 0.65 inches. The opening 26 opens to a passage through the cylindrical body 30.

The outer barb 28, the inner barb 32 and the outer stop collar 34 extend annularly around the outer body 30. The maximum diameter of the outer barb 28 preferably is larger than the maximum diameter of the inner barb 32, and the diameter of collar 34 preferably is larger than both the barbs 28 and 32. For example, the maximum diameters of the outer barb 28 could be 0.667 inches and the maximum diameter of the inner barb could be 0.59 inches. The depth of the outer barb 28 could be 0.061 inches and the depth of the inner barb 32 could be 0.023 inches. The axial length of the outer barb 28 could be 0.27 inches and the axial length of the inner barb 32 could be 0.09 inches.

The collar 34 provides a stop that engages a supply line when the connector has been inserted into the supply line and that engages the terminal end of a dripline being attached to the connector. The outer barb 28 and the inner barb 32 are spaced apart a predetermined distance that enables the outer barb 28 to provide the primary grip on the dripline and the inner barb 32 to provide a secondary grip on the dripline. If the barbs 28 and 32 are spaced too close together, the dripline will extend over the inner barb 32 due to the larger diameter of the outer barb 28 and not be gripped by the inner bar 30. For example, a spacing between the barbs 28 and 32 could be 0.25 inches.

The inlet segment 24 includes a first generally cylindrical segment 36 and a second generally cylindrical segment 38. The outside diameter of the first segment 36 is larger than the outside diameter of the second segment 38. For example, the outside diameter of the first segment 36 could be 0.415 inches and the diameter of the second segment 38 could be 0.355 inches. The two segments 36 and 38 are separated by an inner stop collar 40 with an inner annular cam surface 42. The length of the first segment 36 could be 0.28 inches, the length of the second segment 38 could be 0.375 inches, and the diameter of the stop collar 40 could be 0.451 inches. The first segment 36 has a smaller outer diameter than that of the connector segment 22. The diameter of the first segment 36 is sized so that it can be inserted into the preexisting holes in the supply line 10, while the connector segment 22 is sized to accommodate a drip line. The inner stop collar 40 circumscribes the transition between the first and second segments 36 and 38 and is beveled by the cam surface 42. The cam surface 42 assists with the insertion of the connector 16 into the hole of the line 10.

The second segment 38 includes at least one inlet port 44 and preferably three inlet ports 44. The inlet ports 44 are equally spaced from one another about the second segment 38. The ports 44 can be of any shape and preferably rectangular in shape. The area of the ports 44 is coordinated to provide the desired amount of fluid supply in the particular application. For example, the dimensions of a rectangular port could be approximately 0.25 inches by 0.112 inches. Each inlet port 44 is defined by an inlet port perimeter 46. The perimeter 46 could be rounded or angled to assist smooth intake flow. A passageway interconnects the ports 44 and the opening 26 to provide flow through the connector 12. By way of example, the passageway could have a minimum diameter of 0.19 inches and a maximum diameter of 0.438 inches.

The inlet segment 24 also includes a third segment 48 having an outer annular cam surface 50 and a plug opening 52 to receive the stabilization plug 18. By way of example, the maximum outer diameter of the third segment 48 could be 0.395 inches. The cam surface 50 also assists with insertion of the connector 16 into the supply line 10. The opening 52 extends through segment 48 to form a socket 54. The length of socket 54, for example, could be 0.112 inches. As explained further below, the socket 54 includes a constriction that engages with the stabilization plug 18 to lock the plug 18 in the connector 12.

Figure 5:
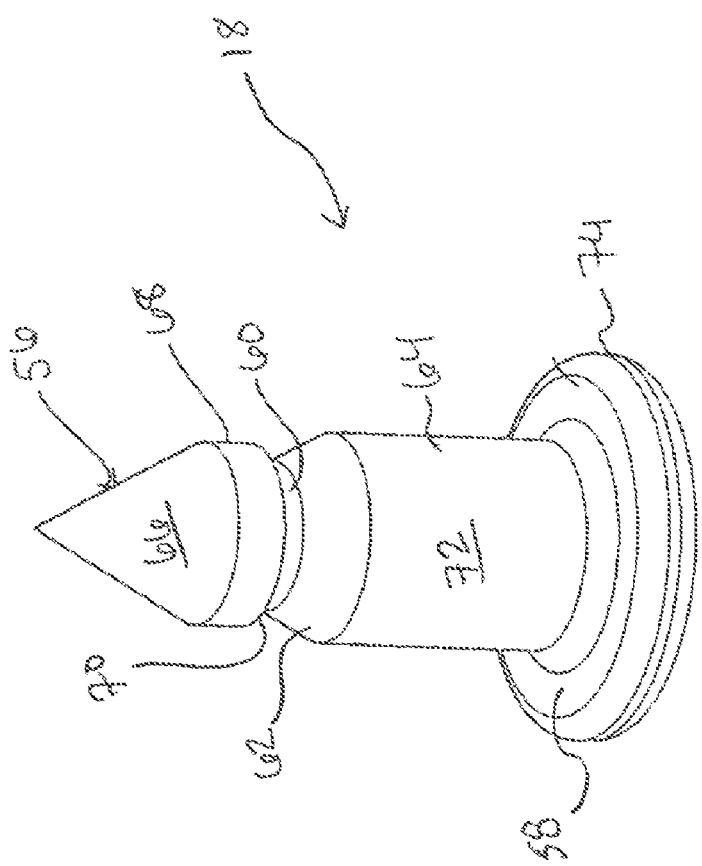
FIG. 5 is a perspective view of the plug of the connector of FIG. 2.

Referring to FIG. 5, the stabilization plug 18 includes at one end a conical tip 56 and at the other end a stop collar 58. In between these ends, there is a neck 60 and a cylindrical wall 64. The tip 56 is defined by a cam surface 66 that assists with insertion of the plug 18 into the connector 16. The neck 60 is between a retainer ledge 68 of the tip 56 and an annular stop surface 62. The ledge 68 has a lock surface 70 which steps into the neck 60. The annular stop surface 62 transitions to the neck 60 to the cylindrical wall 64, which has an outer surface 72. The wall 64 terminates at the stop collar 58 having a perimeter 74, preferably of circular configuration. As explained below, the ledge 68, the lock surface 70, the neck 60, the stop surface 62 and collar 58 lock the plug 18 in the socket 54 of the third segment 48 of connector 16. The overall length of the plug, for example, could be 1.92 inches, and the distance between the neck 60 and stop collar 58 could be 0.238 inches.

Referring to FIG. 6, to assemble the connector body 16 with the line 10, the connector 16 is inserted into the supply line 10 through an opening 76 formed in the existing main supply line 10. The opening 76 is preferably preformed in the supply line 10, such as by drilling or punching. The opening 76 is defined by an opening perimeter 78. The inner and outer annular cam surfaces 42 and 50 deflect the opening perimeter 78 and assist the connector 16 to pass through the opening 76. When the connector 16 has traveled a predetermined distance, such as approximately 1.08 inches, the outer stop collar 34 contacts the line 10 about the perimeter 78 of the opening 76 and prevents the connector 16 from traveling any further into the line 10. The inner stop collar 40, adjacent to the inner cam surface 42, prevents the connector 16 from being removed from the line 10. A supply line wall 80 about the perimeter 78 lies between the inner collar 40 and the outer collar 34. The perimeter 78 and adjacent area about the opening 76 forms a seal against the first segment 36 of the inlet segment 24 to prevent water from leaking.

The stabilizing plug 18 extends through the wall of line 10 into the socket of the plug segment 48. The opening 76 in the line 10 can be prefabricated, such as by drilling or punching, to accommodate the plug, or the tip 56 can create an opening by puncturing line 10 itself. The cam surface 66 of the tip 56 creates a wedge to deflect a perimeter 81 and a surrounding wall of the line 10 at the plug opening 52 to assist in inserting the plug 18. The constriction in the socket 54 is bound by an annular protrusion 82 extending into the socket 54. The surface 66 also deflects the annular protrusion 82 to widen the annular protrusion 82 so the ledge 68 can pass through and the neck 60 receives the annular protrusion 82 to lock the plug 18 in the socket 54.

The stop collar 58 prevents the plug 18 from being inserted too far into the connector 16. During insertion, the plug 18 also draws the wall 80 of the line 10 about the plug opening 52 into the socket 54 to create a seal. Once the lock surface 70 moves past the protrusion 82, the opening created by the annular protrusion 82 adjusts to more of the size of the neck 60 since now the neck 60 receives the protrusion 82. The smaller opening created by the protrusion 82 secures the tip 56 in place since it is sandwiched between the larger diameter ledge 68 and the annular stop surface 62.

The cap 20 on the connector segment 22, having a wall 84, is installed over the connector 16 and the outer barb 28. The outer barb 28 presses outward on the inside of the cap wall 84 to grip the cap. The inner diameter of cap 20 is slightly smaller than the maximum diameter of the barb 28. For example, the inner diameter of the cap may be 0.62 inches, and the maximum outer diameter of the outer barb may be 0.667 inches. The wall 84 stretches around barb 28 and creates a snug fit, holding the cap 20 in place over the connector 16. A recess 86 in the top of cap 20 sits within the connector opening 26 and creates a seal around the opening 26. The cap 20 can be removed or left installed, for example, when the connector will not be used for a lateral dripline.

Figure 7:
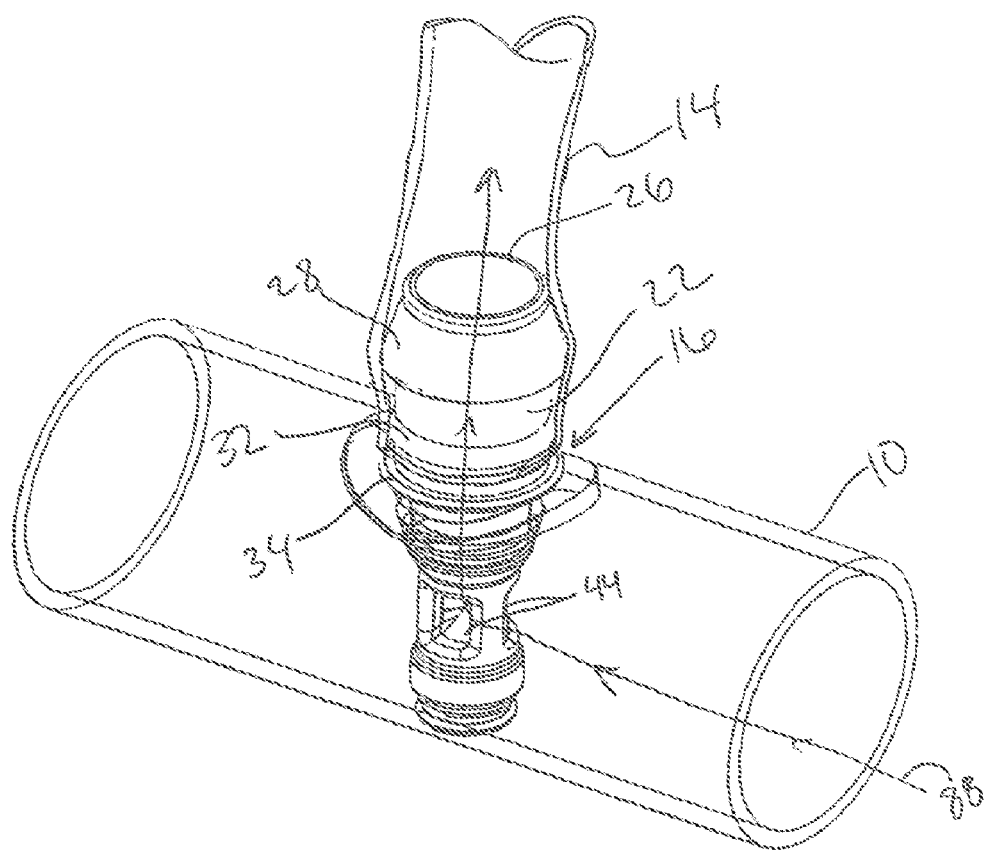
FIG. 7 is a perspective view of the lateral connector of FIG. 2 with the cap removed and a lateral line connected thereto and the main supply being transparent.
Figure 13:
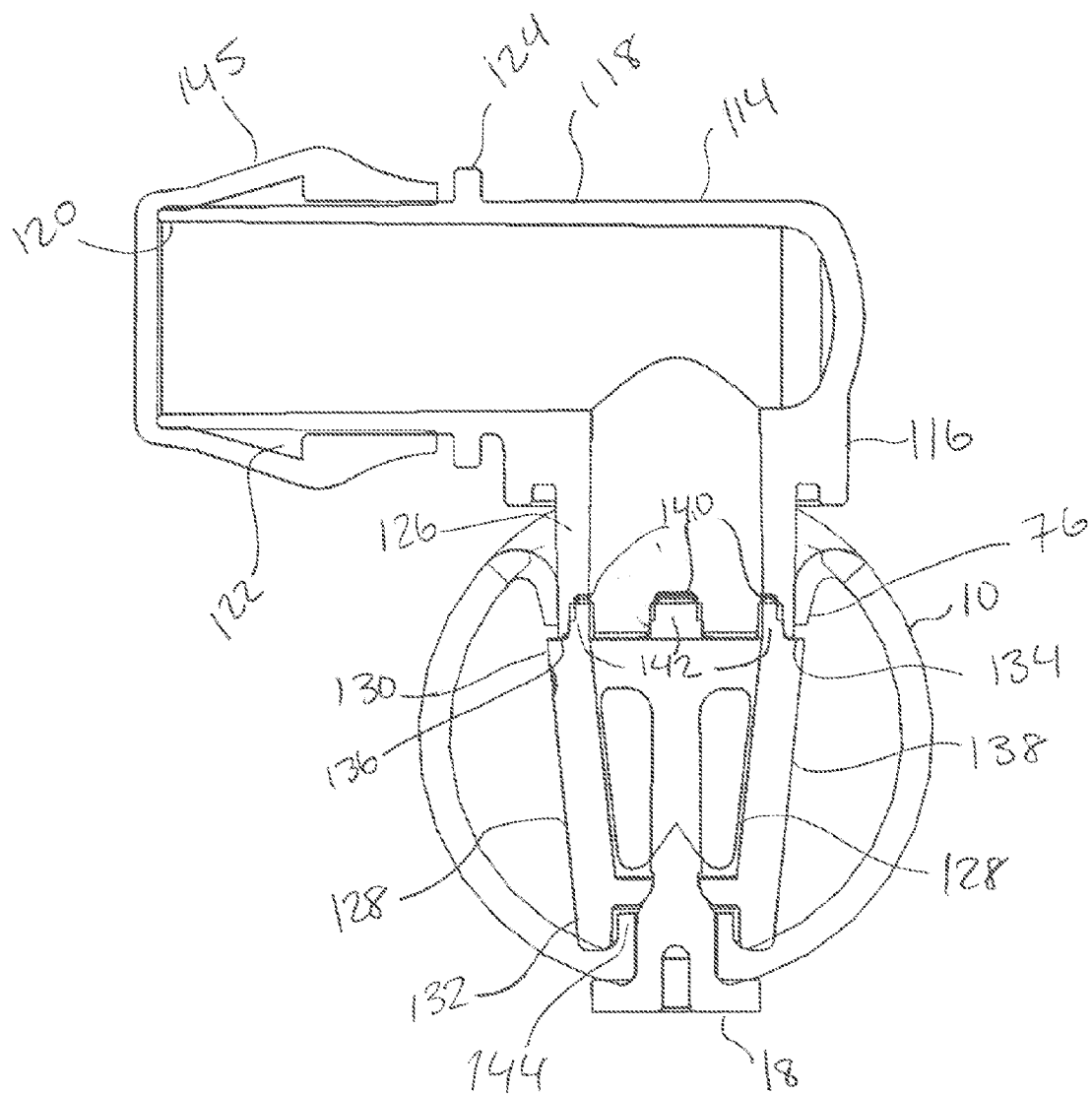
FIG. 13 is a cross-section view of a fifth alternate embodiment of a lateral connector attached to the main supply line.
Figure 14:
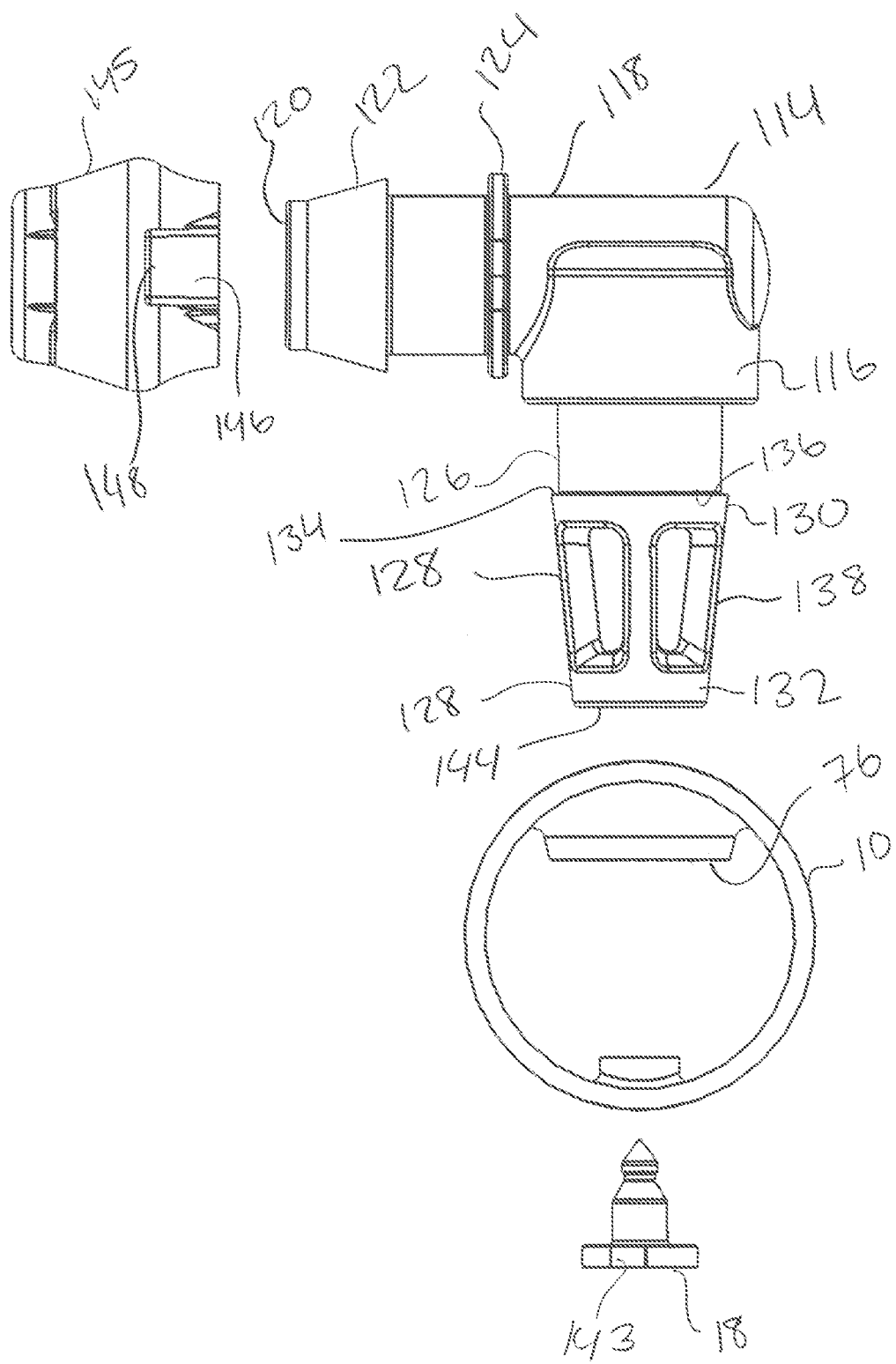
FIG. 14 is an exploded side elevation view of a lateral connector with the main supply line.
Figure 15:
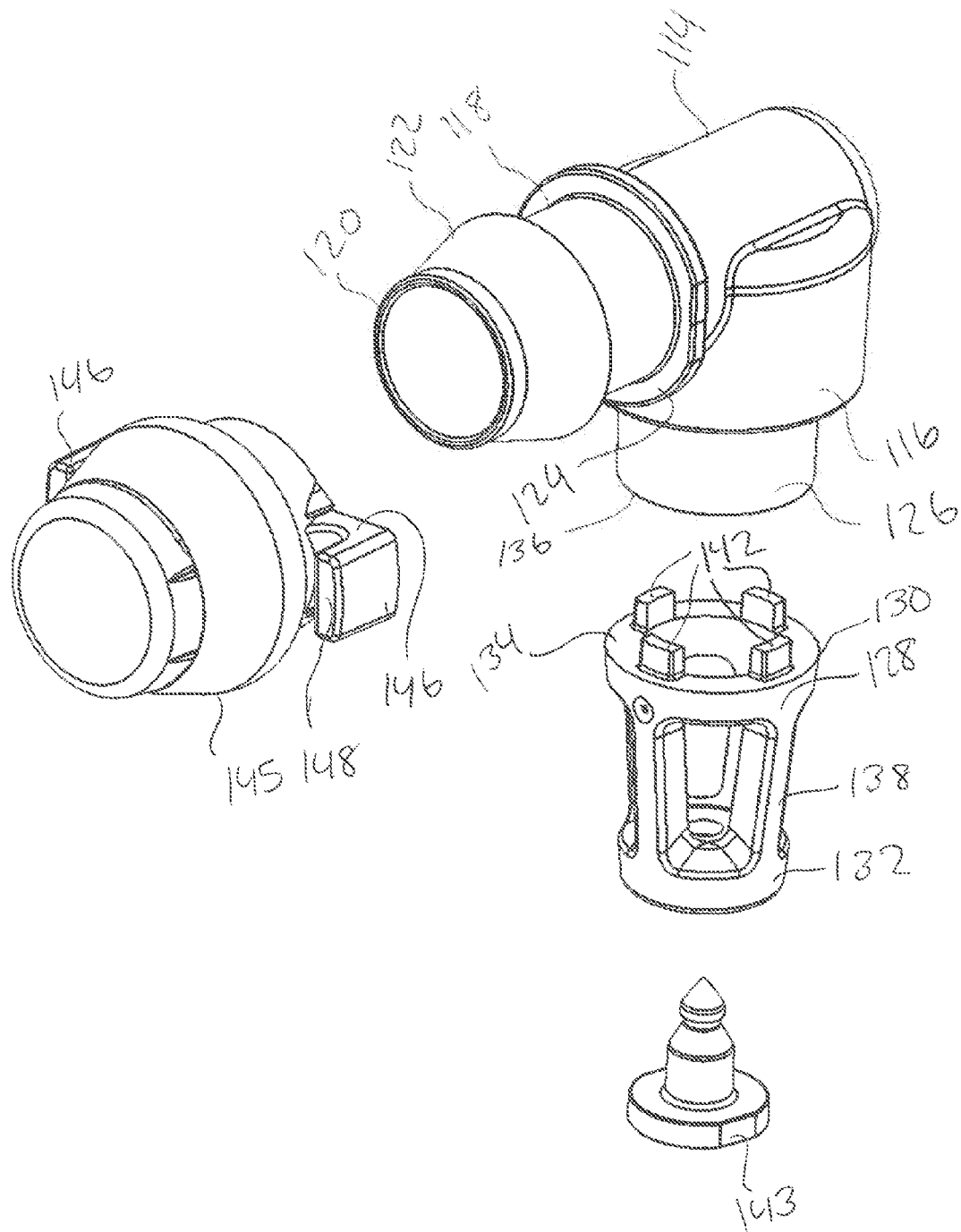
FIG. 15 is an exploded perspective view of the lateral connector of FIG. 13.
Figure 16:
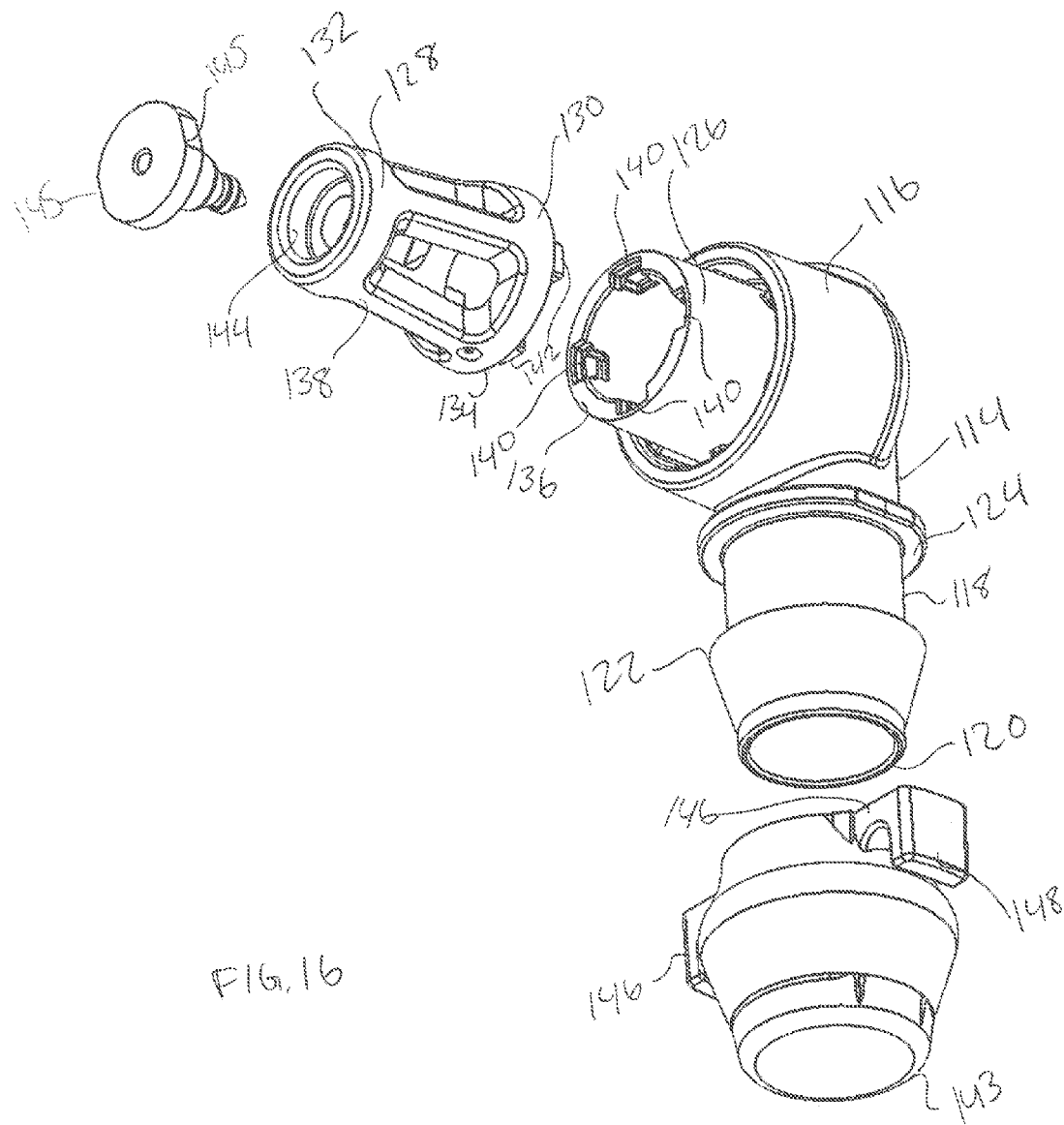
FIG. 16 is an exploded perspective view of the lateral connector of FIG. 13.

Referring to FIG. 7, the connector 16 and the supply line 10 are shown with the cap 20 removed. The cap 20 can be left installed if a particular connector 16 does not need to be used, but to install a lateral line, such as a dripline, the cap 20 is removed. The dripline 14 is press fit onto connector segment 22. The barbs 28 and 32 press outward on dripline 14 because the inner diameter of dripline 14 is slightly smaller than the maximum diameters of barbs 28 and 32. The dripline 14 stretches around the barbs 28 and 32 and the outer edge of the barbs 28 and 32 grips the dripline to hold it in place on the connector 16. The gripping should be sufficient enough that a predetermined pressure in the system, depending on the application, will not burst the connection. For example, for typical irrigation applications, the connection should be able to withstand at least a supply pressure of 50 psi. The stop collar 34 prevents the dripline from being pressed too far onto the connector 16.

Water or an appropriate fluid flows along the path 88 through main supply line 10 and into the inlet ports 44. The inlet ports 44 are positioned with the line 10 to intake the appropriate flow for the desired application and allow the remainder of the fluid to flow past in order to feed other connectors 12 where appropriate. Fluid flows through the ports 44 into the connector body 16. From the body 16, fluid flows into the dripline 14 through the opening 26.

Referring to FIG. 8, the cap 20 has a tear strip 90 that is bounded on two sides by frangible connections 92. The tear strip 90 has a handle 94 that protrudes radially from the cap 20. The frangible connections 92 are a thin walled section of the strip 90, which can be formed in the cap wall 84 during molding or by later removal of material. When the handle 94 is pulled away from the cap 20, stress occurs with the material breaking at the weakest or thinnest areas, being the frangible connections 92. This enables the strip 90 to separate from the cap 20 as the frangible connections 92 tear upward. The handle 94 has a gripping rib 96 attached at its outer end, which assists the user to grasp the handle and apply force to separate the strip 90. Separating the strip 90 from the cap 20 enables the cap wall 84 to flex radially outward. Since the wall 84 can now flex outward around barb 28, the compression fit around the outer barb 28 is released, and the cap 20 can be removed.

During manufacturing, the main supply line 10 maybe be extruded and then the holes for the connector 12 and stabilization plug 18 may be formed, by drilling or punching, on diametrically opposite sides of the supply line 10. Next, the connector 12 and plug 18 are inserted into their respectable holes and locked together. The connector 12 and plug 18 may be inserted in series or simultaneously. The line 10 is then coiled and packaged. The preferred method of manufacture is where all steps are automated and performed in a single in-line process. Alternatively, the steps could be done in different off-line processes and/or some could be done manually.

Figure 9:
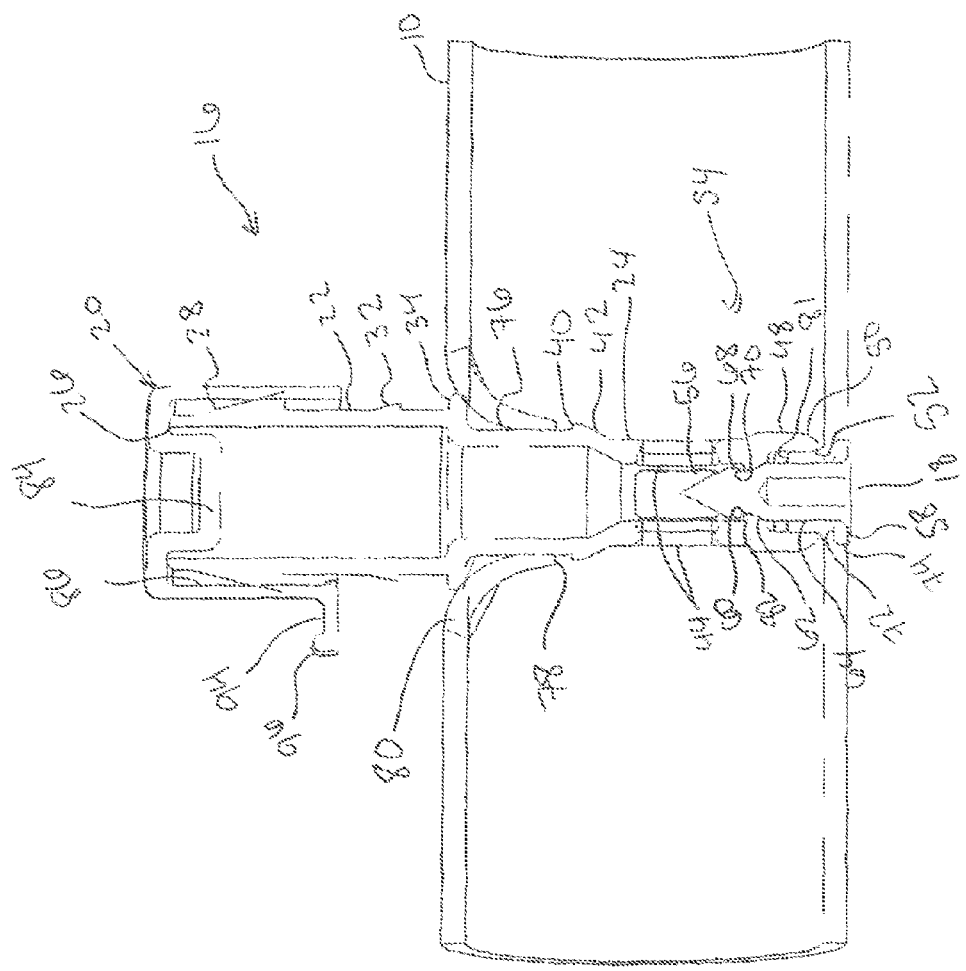
FIG. 9 is a cross-section view of an alternate embodiment of a lateral connector attached to the main supply line.

Alternatively, the connector body 16 could be used without the stabilization plug 18. In one embodiment, a distal end 98 of the segment 38 may be staked to an inside surface 100 of the line 10. It may be welded or glued 102 to the inside surface 100. In such case, the socket 58 is not necessary, and the end of the connector body may be a surface used to weld or glue the connector body 16 to the line 10 (see FIG. 9). As another alternative, a portion 102 of the wall of the line 10 may be formed so to insert into the socket 58 to stake the connector body 16 (see FIG. 10).

Another alternate embodiment of the connector body 16 is shown in FIG. 11. With this embodiment, the segment 38 includes a stake 104 that has a pointed end 106 that pierces the wall 100 of line 10 upon insertion of the connector body 16. There is no need to pre-form a hole for the connector body on either side of the line 10. Alternatively, pilot holes may be made to assist the piercing, if desired, or pre-formed holes may be used as desired. The stake 104 may be molded as a single piece with the connector body 16, or it can be welded or glued to the connector body 16. Once extended through the wall 100, the pointed end 106 can be peened, such as by ultrasonic staking or heat staking. This process may connect the pointed end 106 to a flat head like configuration, such as the head 112 shown in FIG. 12.

A further embodiment is shown in FIG. 12. In this embodiment, the segment 38 includes a plug 108 that is forced through a hole pre-formed in the wall 100 of the line 10. The plug 108 includes a neck 110 and head 112. The neck 110 is preferably slightly smaller in diameter than the hole, while the head 112 is larger in diameter than the hole. The distance between the head 110 and the stop collar 34 is coordinated, preferably, to be approximately the outer diameter of the line 10. The portion of the wall defining the hole seals around the neck 110 and against the head 108. The plug 108 may be molded as a single piece with the connector body 16, or it can be welded or glued to the connector body 16.

A further embodiment is shown in FIGS. 13, 14, 15 and 16. In this embodiment, a connector body 114 has a 90 degree configuration with an inlet segment 116 extending perpendicularly from the supply line 10 and a connector segment 118 extending perpendicularly to the inlet segment 116. This configuration provides flexibility in installation solutions. The connector body 114 can be rotated within the opening 76 about 360 degrees, allowing an opening 120 of the connector segment 118 to face in any direction in its plane of rotation. The ability of the body 114 to rotate provides the flexibility for driplines to be attached on either side of the supply line 10, which could be desirable to simplify installation. A dripline also could be attached at a wider range of angles with respect to the supply line 10, which would enable a dripline to be laid out in a variety of non-conventional patterns, such as angled and non-repeating.

The connector segment 118 includes an outer barb 122 and an outer stop collar 124. The outer barb 122 and the outer stop collar 124 extend annularly around the segment 118. The dimensions of the outer barb 122 are the same that described before. The collar 124 provides a stop that engages a supply line when the connector segment 118 has been inserted into the supply line and that engages the terminal end of a dripline being attached to the connector. The outer diameter of the collar 124 is the same as that described before. The outer barb 122 provides the primary grip on the dripline.

The inlet segment 116 includes a first generally cylindrical segment 126 and a second conical segment 128. The conical segment 128 has a large portion 130 and a small portion 132. The outside diameter of the first segment 126 has a smaller diameter than the large portion 130. The small portion 132 has a smaller diameter than the diameter of the large opening. For example, the outer diameter of the first segment 126 could be 0.55 inches, the outer diameter of the large portion 130 could be 0.6 inches, and the outer diameter of the small portion 132 could be 0.454 inches.

The surface between the large portion 130 and the first segment 126 defines a ledge 134. The ledge 134 prevents the connector 114 from being removed from the line 10. Downstream of the ledge 134, the first segment 126 also has a second ledge 136 that can engage the outside of the tube 10. The distance between the ledges 134, 136 is designed to be coordinated with the length of the inward formed tube material and the thickness of the tube. It is preferred to eliminate as much play as possible to provide a good seal and secure engagement at the insertion. The small portion 132 is sized so that it can be inserted into the preexisting holes in the supply line 10, while the connector segment 118 is sized to accommodate a drip line. A cam surface 138 joins the large portion 130 and small portion 132. The cam surface 138 assists with the insertion of the connector 114 into the hole of the line 10.

The first segment 126 includes four pockets 140 extending from the terminal end along the inner surface. The second segment 128 includes four tabs 142 extending from its terminal end. The tabs 142 fit into the pockets 140 to orient the second segment 128 with regards to the first segment 126. This also creates a press-fit joining the first segment 126 to the second segment 128. The first segment 126 and the second segment 128 also may be welded together at this point by any conventional method such as heat or sonic welding. They also may be bonded together by an adhesive. The height of the pocket 140 could be 0.095 inches, the width could be 0.125 inches, and the depth could be 0.050 inches. The height of the tab 142 could be 0.085 inches, the width could be 0.120 inches, and the depth could be 0.045 inches.

The conical segment 128 includes at least one inlet port 128 and preferably four inlet ports 128. The inlet ports 128 are equally spaced from one another about the conical segment 128. The ports 128 can be of any shape and preferably trapezoidal in shape. The area of the ports 128 is coordinated to provide the desired amount of fluid supply in the particular application. For example, the general dimensions of a port could be between approximately 0.185 inches by 0.250 inches and 0.235 inches by 0.475 inches. A passageway interconnects the ports 128 and the opening 120 to provide flow through the connector body 114. By way of example, the passageway could have a minimum diameter of 0.272 inches and a maximum diameter of 0.55 inches.

The inlet segment 128 supports a socket 144 at its terminal end. The socket 144 receives the plug 18 while securing the connection to the diametrically opposed side wall of the tube 10. This provides a secure attachment to the tube as discussed above. The plug 10 has two flattened surfaces 143 at the terminal end to provide a gripping surface. The flattened surfaces 143 allows the plug 18 to be handled more easily, assisting the assembly and installation of the plug 18 into the supply line 10.

Figure 17:
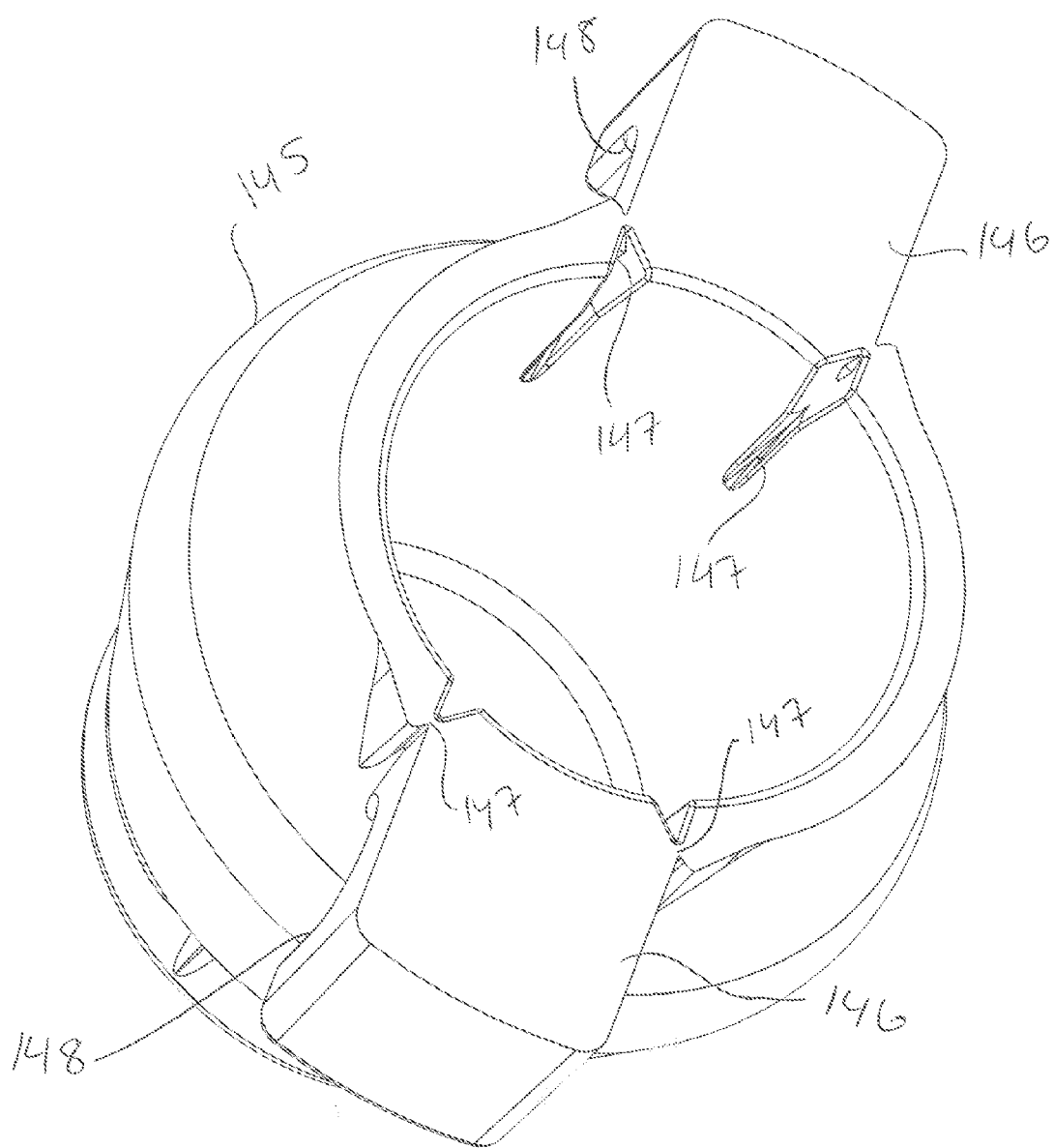
FIG. 17 is a perspective view of the cap of the lateral connector of FIG. 13.

Referring to FIG. 17, the cap 145 has two tabs 146. Each tab is defined by two frangible connections 147. Each tab 146 has a curved protrusion 148 that is shaped so that it can be gripped by a tool such as pliers. When the tool is rotated, the tab 146 and the frangible connections 147 break. Doing this frees the cap 145 by releasing the compression fit around the barbs 122 as previously described. The ability to rotate the tab 146 eases the removal of the cap 145 because the user does need displace the tool to pull the tab 146 away from the cap 145. The user can instead use rotational leverage by rotating the plier head along the cap 145 while gripping the tab 146.

As with the initial embodiments, these alternative embodiments may be manufactured with the installation being done inline with forming the dripline or may be done offline after the dripline is formed.

While the foregoing description is with respect to specific examples, those skilled in the art will appreciate that there are numerous variations of the above that fall within the scope of the concepts described herein and the appended claims.

What is claimed is:

1. A fluid supply line comprising:
   a fluid supply conduit having a side wall;
   a lateral distribution connector being preassembled to extend through the side wall of the conduit;
   the connector having a conduit connecting segment extending outside the conduit and an inlet segment extending into the conduit;
   a portion of the side wall extending into the conduit about a portion of the inlet segment to form a seal with the inlet segment;
   wherein the conduit with the connector being coiled;
   the conduit connecting segment being rotatable relative to the conduit; and
   wherein the conduit connecting segment includes a connection protrusion outside of the conduit that is adapted to receive a lateral line; and further comprising a protector about the connection protrusion.

2. The fluid supply line of claim 1 wherein the inlet segment has a terminal end and a weld attaches the terminal end to the side wall of the conduit.

3. The fluid supply line of claim 1 wherein the inlet segment has a terminal end and an indentation in the side wall of the conduit connects to the terminal end.

4. The fluid supply line of claim 1 wherein the inlet segment has a terminal end and a stake attaches the terminal end to the side wall of the conduit.

5. The fluid supply line of claim 1 wherein the inlet segment is welded or glued to the inner surface of the side wall of the conduit.

6. The fluid supply line of claim 1 further comprising at least one socket defined by the inlet segment; and a plug extending through the side wall of the conduit and received in the at least one socket to connect the terminal end to the side wall of the conduit.

7. The fluid supply line of claim 6 wherein the plug forms a mechanical connection with the socket.

8. The fluid supply line of claim 7 wherein the plug defines a recess and the socket includes a protrusion configured to extend into the recess.

9. The fluid supply line of claim 1 further comprising a plurality of the connectors installed at predetermined locations along the conduit.

10. The fluid supply line of claim 1 wherein the conduit connecting segment defines an outlet, the inlet segment defines at least one inlet, and the connector defines a fluid passage interconnecting the outlet and the at least one inlet.

11. The fluid supply line of claim 10 wherein the at least one inlet includes a plurality of inlets equally spaced from one another.

12. The fluid supply line of claim 1 wherein the connection protrusion includes a barb.

13. The fluid supply line of claim 11 wherein the connecting segment includes another barb.

14. The fluid supply line of claim 12 wherein the connector includes at least one stop.

15. The fluid supply line of claim 1 wherein the conduit connecting segment and the inlet segment are disposed at an angle to one another.

16. The fluid supply line of claim 15 wherein the angle is 90 degrees.

17. A fluid supply line comprising:
a conduit having a side wall;
a connector being preassembled to extend through the side wall of the conduit;
the connector having a conduit connecting segment extending outside the conduit and an inlet segment extending into the conduit, a portion of the sidewall extending into the conduit about a portion of the inlet segment to form a seal with the inlet segment;
wherein the conduit with the connector being coiled;
wherein the conduit connecting segment includes a connection protrusion;
further comprising a protector about the connection protrusion; and
wherein the protector includes a frangible portion that is separable to remove the protector.

18. A method of making a conduit comprising the steps of:
providing a length of conduit with a side wall;
creating a series of first holes through the side wall of the conduit;
inserting a connector in each of the first holes such that a conduit connecting segment of each connector extends outside the conduit and an inlet segment of each connector extends inside the conduit, wherein the conduit connecting segment of each connector includes a connection protrusion outside of the conduit that is adapted to receive a lateral line, wherein each connector further comprises a protector about the connection protrusion;
extending a portion of the sidewall into the first holes about the inlet segments to form a seal with the inlet segments; and
coiling the length of conduit having the connectors in the first holes of the side wall of the conduit.

19. The method of claim 18 further comprising inserting a portion of the side wall into a recess defined by a terminal end of the inlet segment.

20. The method of claim 18 further comprising welding or gluing a terminal end of the inlet segment to the sidewall of the conduit.

21. The method of claim 18 further comprising creating a series of second holes through the side wall of the conduit, inserting a plug in each of the second holes, and interconnecting each plug in a socket defined by the inlet segment of each connector.

22. The method of claim 21 further comprising the step of creating the series of first holes at constant distances apart.

23. The method of claim 21 wherein the first holes and the second holes are diametrically opposed to one another.

24. The method of claim 21 further comprising the step of creating a series of second holes using the plug for each of the second holes.

25. A preassembled irrigation line comprising:
a flexible fluid supply conduit having a side wall with a plurality of openings, the conduit being coiled;
a plurality of lateral distribution connectors preinstalled to extend through the side wall openings of the coiled conduit, the plurality of connectors being spaced along the coiled conduit at predetermined distances;
each connector having a conduit connecting segment extending outside the conduit and an inlet segment extending through one of the openings and into the conduit;
the inlet segment having an enlarged portion sized to be advanced through the one opening and into the conduit for preinstalling the connector to the conduit;
the conduit connecting segment having a connection protrusion outside of the conduit adapted to receive a lateral line;
a portion of the conduit extending into the conduit about a portion of the inlet segment to form a seal at the inlet segment of each connector; and
each connector further comprising a protector about the connection protrusion.

26. The irrigation line of claim 25 wherein the connection protrusion includes at least one barb.

27. The irrigation line of claim 26 wherein the at least one barb includes a plurality of barbs.

28. The irrigation line of claim 26 wherein the connector includes at least one stop.

29. The irrigation line of claim 25 wherein the conduit connecting segment and the inlet segment are disposed at an angle to one another.

30. The irrigation line of claim 29 wherein the angle is 90 degrees.

31. The irrigation line of claim 30 wherein the connector is rotatable relative to the conduit.

32. The irrigation line of claim 25 wherein the lateral line includes irrigation dripline.

33. The irrigation line of claim 25 wherein the protector includes a removable cap.

34. The irrigation line of claim 25 wherein the protector has a generally annular wall portion extending about the connection protrusion for protecting the connection protrusion.

35. The irrigation line of claim 34 wherein the protector annular wall portion includes an inner surface spaced from the connection protrusion.

36. The irrigation line of claim 34 wherein the conduit connecting segment includes an opening and the protector comprises a cap with a lid portion for covering the conduit connecting segment opening and the generally annular wall portion extends from the lid portion.

37. A preassembled irrigation line comprising:
a flexible conduit having a sidewall;
a plurality of connectors preinstalled to extend through the side wall of the conduit, the plurality of connectors being spaced along the conduit at predetermined distances;
each connector having a conduit connecting segment extending outside the conduit and an inlet segment extending into the conduit;
the conduit connecting segment having a connection protrusion capable of attachment to other flexible tubing;
a portion of the flexible conduit extending into the conduit about a portion of the inlet segment to form a seal at the inlet segment;
further comprising a protector about the connection protrusion;
wherein the protector includes a removable cap; and
wherein the removable cap includes a frangible portion that is separable to remove the cap.

38. An irrigation line comprising:
a flexible fluid supply conduit having a side wall with a plurality of openings;
a plurality of lateral distribution connectors being preassembled to extend through the openings of the conduit side wall;
the connectors each having a conduit connecting segment extending outside the conduit and an inlet segment extending into the conduit;
the conduit connecting segment of each connector being rotatable relative to the conduit;
the conduit with the plurality of connectors being coiled; and
wherein the conduit connecting segment of each connector includes a connection protrusion outside of the conduit adapted to receive a lateral line; each connector further comprising a protector about the connection protrusion.

39. The irrigation line of claim 38 wherein the protector has a generally annular wall portion extending about the connection protrusion for protecting the connection protrusion.

40. The irrigation line of claim 39 wherein the protector annular wall portion includes an inner surface spaced from the connection protrusion.

41. The irrigation line of claim 38 wherein the connection protrusion includes a barb.

42. The irrigation line of claim 38 wherein the conduit connecting segment and the inlet segment extend generally perpendicular to each other.

43. The irrigation line of claim 38 wherein the conduit connecting segment of each connector defines an outlet, the inlet segment defines at least one inlet, and the connector defines a fluid passage interconnecting the outlet and the at least one inlet.

44. An irrigation line comprising:
a flexible fluid supply conduit having a side wall with a plurality of openings;
a plurality of lateral distribution connectors being preassembled to extend through the openings of the conduit side wall;
the connectors each having a conduit connecting segment extending outside the conduit and an inlet segment extending into the conduit;
the conduit with the plurality of connectors being coiled; and
wherein the conduit connecting segment of each connector includes a connection protrusion outside of the conduit adapted to receive a lateral line; each connector further comprising a protector about the connection protrusion.

45. The irrigation line of claim 44 wherein the protector has an annular wall extending about the connection protrusion for protecting the connection protrusion.

46. The irrigation line of claim 45 wherein the protector annular wall includes an inner surface portion spaced from the connection protrusion.

47. The irrigation line of claim 44 wherein the connection protrusion includes a barb.

48. The irrigation line of claim 44 wherein the conduit connecting segment and the inlet segment extend generally perpendicular to each other.

49. The irrigation line of claim 44 wherein the conduit connecting segment of each connector defines an outlet, the inlet segment defines at least one inlet, and the connector defines a fluid passage interconnecting the outlet and the at least one inlet.

50. The irrigation line of claim 44 wherein the side wall includes portions extending into the conduit about the inlet segments of the connectors to form seals with the inlet segments.

* * * * *

UNITED STATES PATENT AND TRADEMARK OFFICE
CERTIFICATE OF CORRECTION

PATENT NO. : 9,661,807 B2  
APPLICATION NO. : 13/837738  
DATED : May 30, 2017  
INVENTOR(S) : Michael F. Turk et al.

It is certified that error appears in the above-identified patent and that said Letters Patent is hereby corrected as shown below:

In the Claims

Column 9, Line 33, in Claim 13, delete "claim 11" and insert --claim 12-- therefor.

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*